(12) United States Patent
Hussaini et al.

(10) Patent No.: US 6,992,462 B1
(45) Date of Patent: Jan. 31, 2006

(54) VIDEO GAME CONTROLLER WITH RECHARGEABLE BATTERY SYSTEM

(75) Inventors: Saied Hussaini, Miami, FL (US); Marc Iacovelli, Miami, FL (US)

(73) Assignee: Intec, Inc., Miami, FL (US)

(*) Notice: Subject to any disclaimer, the term of this patent is extended or adjusted under 35 U.S.C. 154(b) by 0 days.

(21) Appl. No.: 11/119,770

(22) Filed: May 3, 2005

Related U.S. Application Data

(63) Continuation of application No. 11/071,591, filed on Mar. 4, 2005.

(60) Provisional application No. 60/647,800, filed on Jan. 31, 2005.

(51) Int. Cl.
*H02J 7/00* (2006.01)

(52) U.S. Cl. .......................... 320/114; 463/39; 345/161

(58) Field of Classification Search ........ 320/113–115; 345/161–169, 176; 463/39
See application file for complete search history.

(56) References Cited

U.S. PATENT DOCUMENTS

| | | | |
|---|---|---|---|
| 5,847,541 A * | 12/1998 | Hahn | ........................ 320/111 |
| 6,342,010 B1 | 1/2002 | Slifer | |
| 6,567,845 B1 | 5/2003 | Chatani | |
| 6,585,596 B1 | 7/2003 | Leifer et al. | |
| 6,659,871 B2 | 12/2003 | Leifer et al. | |
| 6,719,633 B1 | 4/2004 | Leifer et al. | |
| 6,743,101 B2 | 6/2004 | Leifer et al. | |
| 6,784,870 B2 | 8/2004 | Yin | |
| 6,801,967 B2 * | 10/2004 | Nakamura et al. | ............ 710/62 |
| 6,803,676 B2 | 10/2004 | Tanaka et al. | |
| 6,878,066 B2 | 4/2005 | Leifer et al. | |
| 2001/0045938 A1 | 11/2001 | Willner et al. | |
| 2003/0003993 A1 | 1/2003 | Leifer et al. | |
| 2003/0064805 A1 | 4/2003 | Wells | |
| 2003/0199317 A1 | 10/2003 | McCauley | |

* cited by examiner

*Primary Examiner*—Michael Sherry
*Assistant Examiner*—Robert Grant
(74) *Attorney, Agent, or Firm*—Berenato, White & Stavish (57) ABSTRACT

A wireless computer game controller with rechargeable batteries that may be recharged while the batteries are installed on the controller and/or while the controller is in operation. Disposable batteries may also power the controller. In one embodiment, a communication cable connects the controller with a stand-alone computer game console such that the rechargeable battery pack is recharged directly from the game console through the communication cable. The cable not only establishes a communication link to facilitate the transmission of both command signals and audio/video signals between the controller and computer device, but it also deliver a recharge signal to the battery pack through the game controller. In another embodiment, the rechargeable battery pack is recharged through a power cable that establishes a power link with the wireless adapter assembly. A stand-alone cradle may be provided to receive either the controller while the batteries are mounted to the controller or the battery pack separate from controller. The cradle may be part of the wireless adapter assembly that converts the game console into a wireless transmitter/receiver.

5 Claims, 11 Drawing Sheets

VIDEO GAME CONTROLLER WITH RECHARGEABLE BATTERY SYSTEM

This application is a non-provisional application claiming the benefit of U.S. provisional application No. 60/647,800 filed Jan. 31, 2005 and is a continuation of U.S. application Ser. No. 11/071,591 filed Mar. 4, 2005, which are hereby incorporated by reference.

BACKGROUND OF THE INVENTION

1. Field of the Invention

The present invention relates to video game controllers and more specifically to a wireless controller with rechargeable battery pack that may be recharged while installed on the wireless controller, or a wireless controller with disposable batteries that may be powered by a power cable if the batteries become depleted.

2. Description of the Related Art

Computer video games are well known in the art. Such devices range from small hand held all-in-one units, to larger stand-alone units which interact with stand alone controllers and stand alone video display devices. Small hand held devices are very portable. However, the graphics and sophistication game play are substantially inferior to stand alone units due limited processing power and associated peripherals. For more sophisticated play, stand alone computer units provide tremendous processing power and work with associated peripheral devices, such as a remote controller and television display in an attempt to bring the player a more dramatic gaming experience to that of hand held devices. These devices are widely available on the market and are well know in the art.

A central stand-alone console contains all the essential processing components to run a computer game. A controller is connected to communicate operation control commands from a user. A separate display is connected to the gaming device to display interactive video gaming images. As previously mentioned, this conventional arrangement is well known in the art.

With the tremendous commercial success of stand alone computer gaming systems, and entire peripheral market has emerged ranging from advanced video controllers, joysticks, steering wheel devices for racing games, multi-tap controllers, vibrating controllers, video stands, audio systems and the like. Programmable controllers are also available which allow a user to customize the operation of control buttons and to even store and retrieved such customized arrangements.

As a game is played, a player or players control various visual aspects of the game using either the hard-wired or wireless controllers. All of the controllers require power to operate but power sources can be cumbersome or inefficient, especially for wireless controllers. The need exists for a wireless controller that can accommodate alkaline batteries and/or a rechargeable batteries where the rechargeable batteries can be recharged in an efficient and useful manner.

SUMMARY OF THE INVENTION

The present invention is directed to a wireless computer game controller with rechargeable batteries that may be recharged while the batteries are installed on the controller and/or while the controller is in operation.

In one embodiment, a communication cable connects the controller with a stand-alone computer game console such that the rechargeable battery pack is recharged directly from the game console through the communication cable. The cable not only establishes a communication link to facilitate the transmission of both command signals and audio/video signals between the controller and computer device, but it also delivers a recharge voltage to the battery pack through the game controller.

In another embodiment, the rechargeable battery pack is recharged through a stand-alone cradle that receives either the controller while the batteries are mounted to the controller or the battery pack separate from controller. The cradle may be part of an adapter assembly that converts the game console into a wireless transmitter/receiver. The adapter/receiver can act as the rechargeable cradle while the controller is not being used and may require to be recharged during breaktime.

In another embodiment, the rechargeable battery pack is recharged by connecting a power cable directly to the controller and/or directly to the battery pack while the battery pack is mounted to the controller.

In another embodiment, the controller may be powered with disposable (e.g., alkaline) batteries that may be powered by connecting a power cable directly to the controller when the disposable batteries are depleted.

These and other features of the present invention will become more apparent with reference to the following drawings and associated description.

DETAILED DESCRIPTION OF THE PREFERRED EMBODIMENTS

Figure 1:
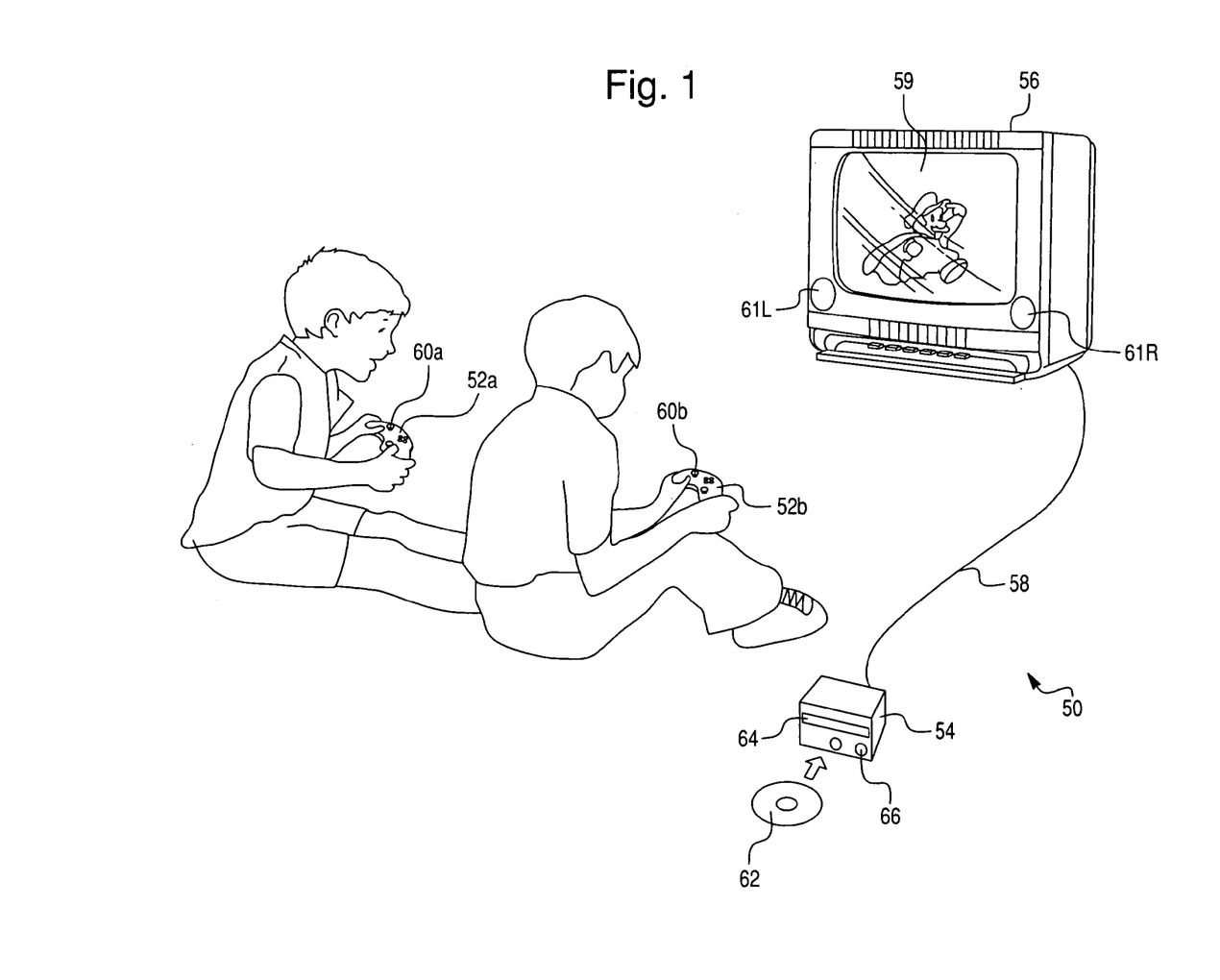
FIG. 1 shows an example interactive computer graphics system with wireless controllers.

FIG. 1 shows an example interactive computer graphics system 50. System 50 can be used to play interactive video games with interesting stereo sound. It can also be used for a variety of other applications.

In this example, system 50 is capable of processing, interactively in real time, a signal in response to real time inputs from handheld controllers 52*a*, 52*b* or other input devices. To play a video game or other application using system 50, the user first connects a main unit 54 to his or her television set or other video display device 56 or other display device by connecting a cable 58 between the two. Main unit 54 produces both video signals and audio signals for controlling the video display device 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52*a*, 52*b* to control main unit 54. Controls 60*a*, 60*b* can be used, for example, to specify the direction (up or down, left or right, closer or further away) that a character displayed on television 56 should move. Controls 60*a*, 60*b* also provide input for other applications (e.g., menu selection, pointer/cursor control, etc.). Controllers 52*a*, 52*b* can take a variety of forms. In this example, controllers 52*a*, 52*b* shown each include controls 60*a*, 60*b* such as joysticks, push buttons and/or directional switches. Typically, such controllers 52*a*, 52*b* may be connected to main unit 54 by cables or wirelessly via electromagnetic (e.g., radio or infrared) waves.

To play an application such as a game, the user selects an appropriate storage medium 62 (e.g., CD, DVD, etc.) storing the video game or other application he or she wants to play, and inserts that storage medium into a slot 64 in main unit 54. Storage medium 62 may, for example, be a specially encoded and/or encrypted optical and/or magnetic disk that stores commands for graphics and audio processor 114 and/or instructions controlling main processor 110 to develop such commands. The user may operate a power switch 66 to turn on main unit 54 and cause the main unit to begin running the video game or other application based on the software stored in the storage medium 62. The user may operate controllers 52 to provide inputs to main unit 54. For example, operating a control 60*a*, 60*b* may cause the game or other application to start. Moving other controls 60*a*, 60*b* can cause animated characters to move in different directions or change the user's point of view. Depending upon the particular software stored within the storage medium 62, the various controls 60*a*, 60*b* on the controller 52*a*, and 52*b* can perform different functions at different times.

Figure 2:
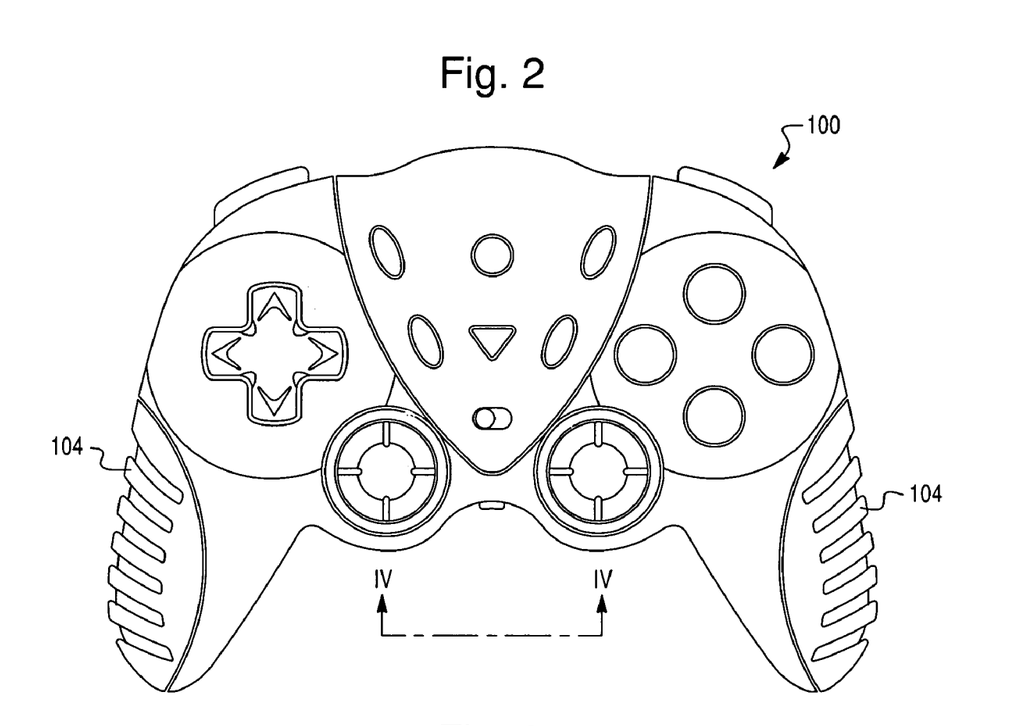
FIG. 2 is a top plan view of a controller according to one embodiment of the present invention.

FIG. 2 depicts a wireless video game controller according to one embodiment of the present invention in the form of a hand held unit 100 ergonomically formed to be held by a hand(s) of a user. The hand held unit 100 includes a plurality of operating members for manipulation of the users hand to facilitate wireless interaction with a game console. The 2.4 GHz (operating frequency) controller may be the programmable type, include a vibratory member for heightened tactile game play as well as lighted buttons etc. The controller 100 preferably includes six (6) Digital Action Buttons; 2 Trigger Buttons; a Turbo Function Button; a Power ON/OFF switch; and other suitable buttons/switches. The controller also includes rubberized grips 104 for comfortable handling, and dual expansion slots may also be provided on the remote controller.

Figure 3:
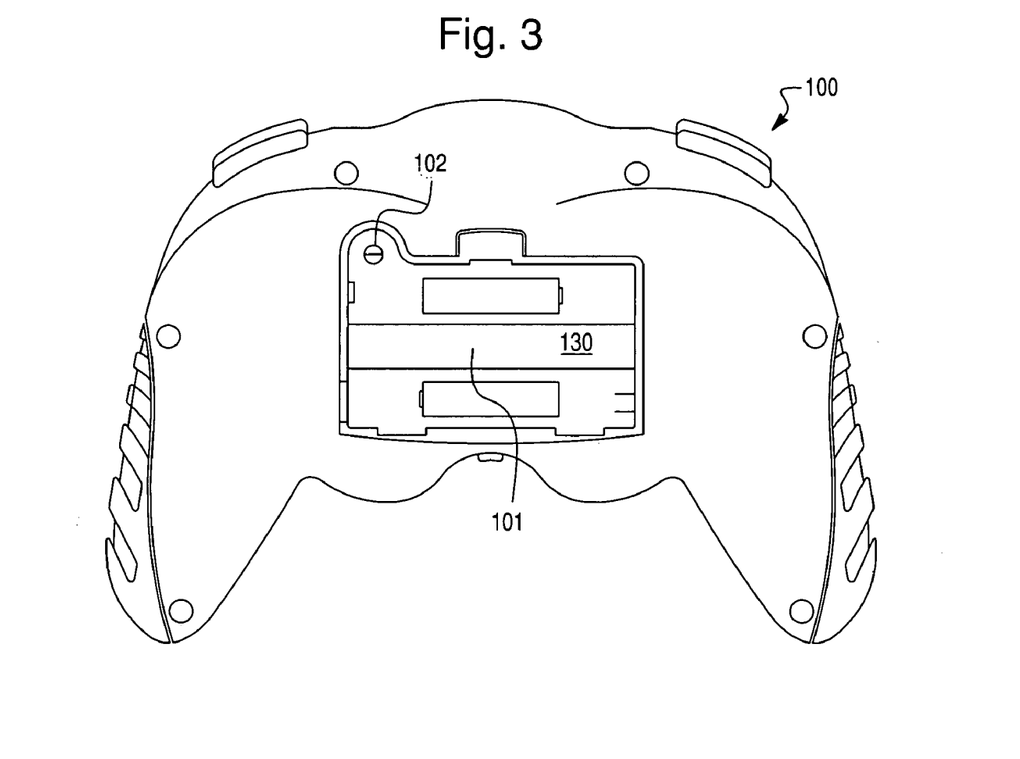
FIG. 3 is a bottom view of a controller shown in FIG. 2.
Figure 4:
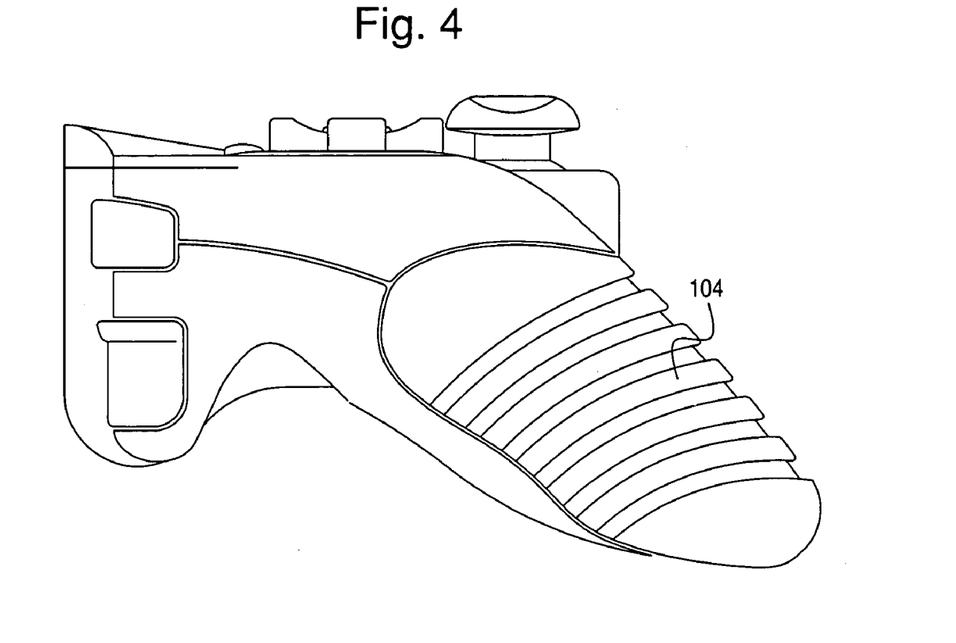
FIG. 4 is an enlarged view of the front of the controller as viewed along view line IV—IV shown in FIG. 2.

With reference to FIG. 3, the wireless controller 100 is powered by 2 "AA" Alkaline Batteries or a 3V DC Rechargeable Battery Pack 130 adapted to fit in the battery compartment 101 of the controller 100 shown in FIG. 3. FIG. 4 is a partial detailed view of the area designated by view lines IV—IV of FIG. 2. With reference to FIG. 4, the controller further includes battery charging port 106 with LED charging indicator 108, as well as a 3 position vibration switch 109 known to those of skill in the art. With the embodiment of FIG. 4, the rechargeable batteries 130 may be recharged by a conventional power cable (not shown).

The present invention also provides a mechanical or electrical switch 102 on the controller that is closed when the rechargeable battery pack 130 is placed in the battery compartment 101. Due to the physical shape of the battery pack 130, an actuator on the battery pack 130 closes the switch 102. However, when conventional disposable batteries are used, the switch 102 is not closed. In other words, an electromechanical actuator/switch 102 functions as charging circuit activation switch to recharge the battery pack 130 when the rechargeable battery pack 130 is disposed in the battery compartment 101 due to the physical interaction between the battery pack 103 and switch 102. When the battery pack 130 is not present or when alkaline batteries 130 are disposed in the battery compartment 101, the electromechanical actuator 102 is not activated and the control circuitry delivers power directly to the controller 100.

Figure 10:
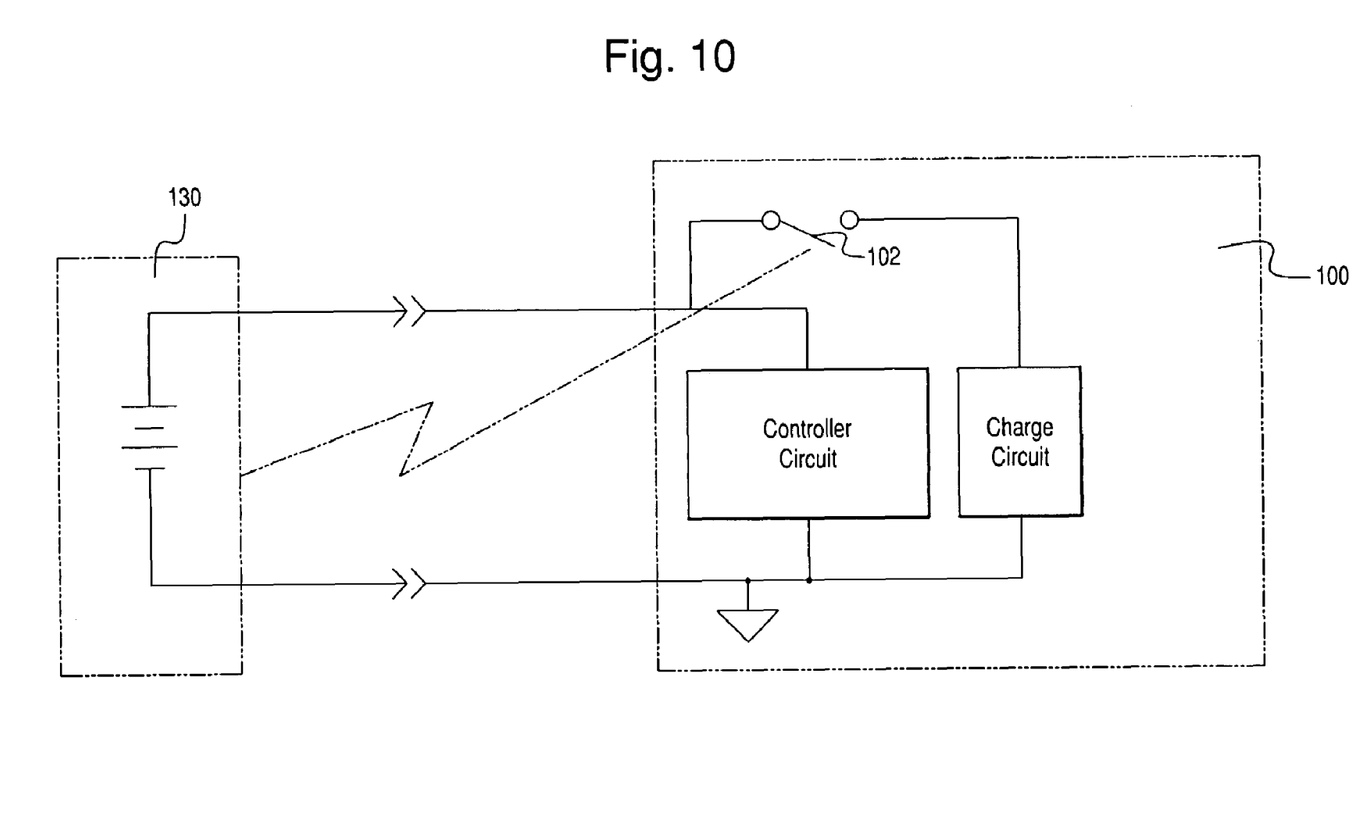
FIG. 10 illustrates a generic and conceptual charge circuit for the rechargeable battery pack.

FIG. 10 shows a generic and conceptual charge circuit for the rechargeable battery pack 130. Switch 102 is closed only when the rechargeable battery pack 130 is placed in the compartment 101 and a mechanical actuator on the battery pack 130 closes the switch 102.

Figure 11:
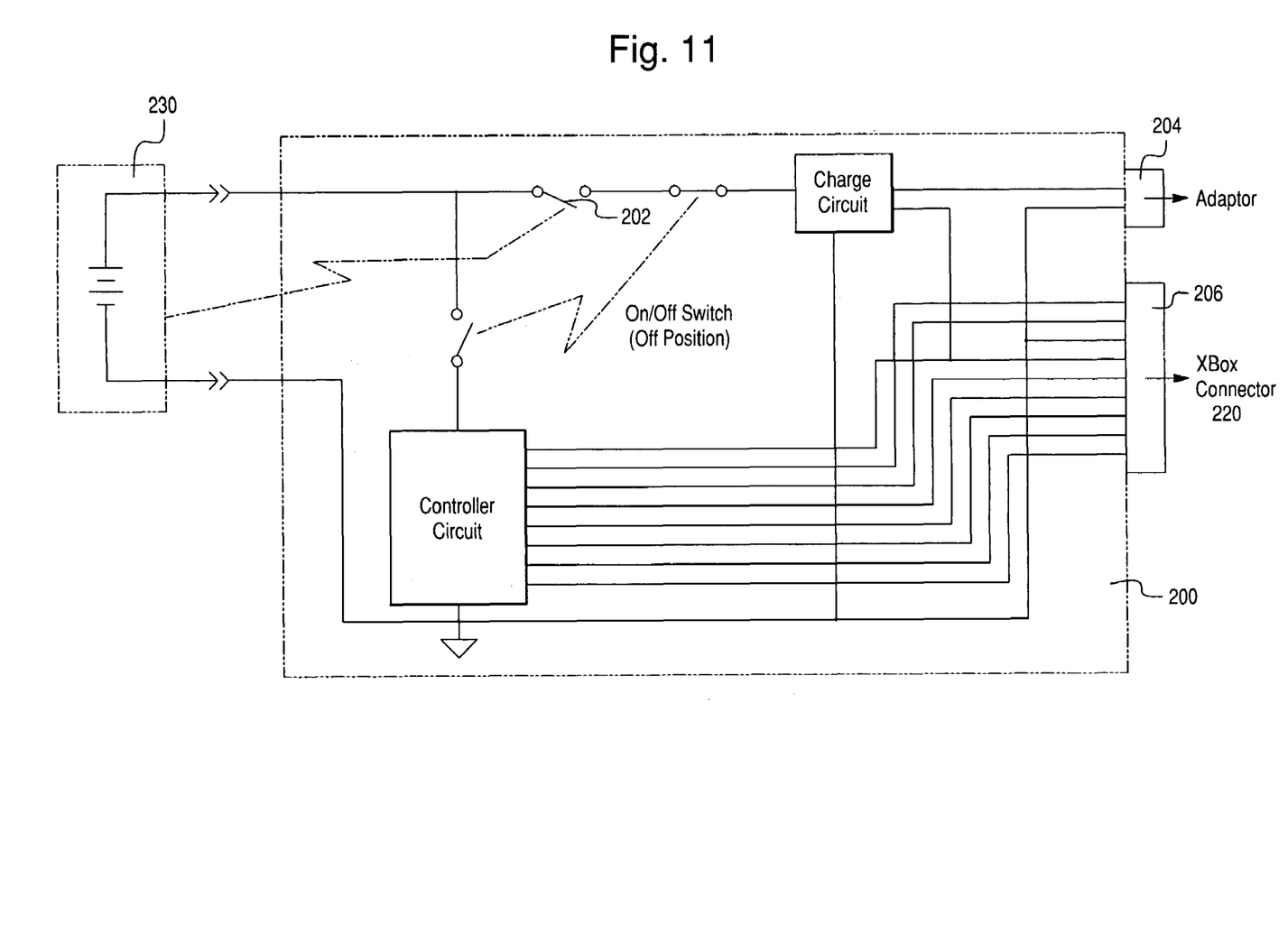
FIG. 11 illustrates a specific recharge circuit for a wireless controller and rechargeable battery pack for use with the XBox® game system.

FIG. 11 shows a specific recharge circuit for a wireless controller 200 and rechargeable battery pack 230 for use with the XBox® game system. The circuit of FIG. 11 allows the controller to be played without charging the battery pack 230 during game play. The circuit of FIG. 11 is used in the system shown in FIG. 6 with cable 200 and plugs 210, 220. Power from an AC adaptor with no charge circuit implementation is connected to port 204. With the controller 200 in the 'off' position, power to charge batteries is provided through port 206 (or port 204). Switch 202 is closed only when the rechargeable battery pack 230 is placed in the compartment 201 of the controller and a mechanical actuator on the battery pack 230 closes the switch 202.

Figure 12:
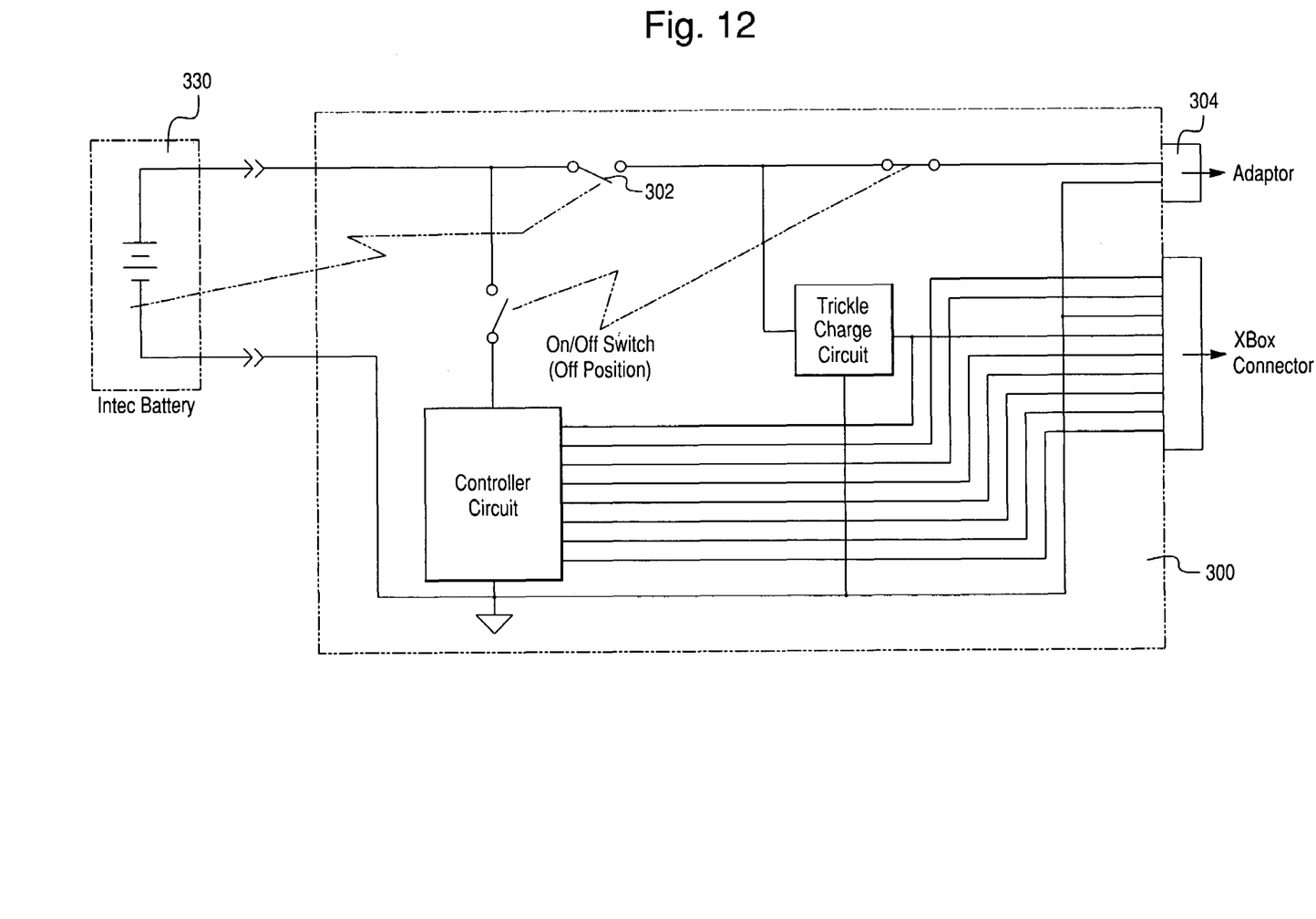
FIGS. 12 and 13 illustrate specific recharge circuits for a wireless controller and rechargeable battery pack for use with the XBox® game system.

FIG. 12 shows a specific recharge circuit for a wireless controller 300 and rechargeable battery pack 330 for use with the XBox® game system. The circuit of FIG. 12 allows the battery pack 330 to be charged during game play or with the controller 300 in the 'off' position. The circuit of FIG. 12 is also used in the system shown in FIG. 6 with cable 200 and plugs 210, 220. Power from an AC adaptor with a charge circuit is applied directly to the batteries through port 304 for charging when the controller on/off switch is in the 'off' position. With the controller 300 in the 'on' or 'off' position, trickle charge is provided through port 206. Switch 302 is closed only when the rechargeable battery pack 330 is placed in the compartment of the controller and a mechanical actuator on the battery pack 330 closes the switch 302.

Figure 13:
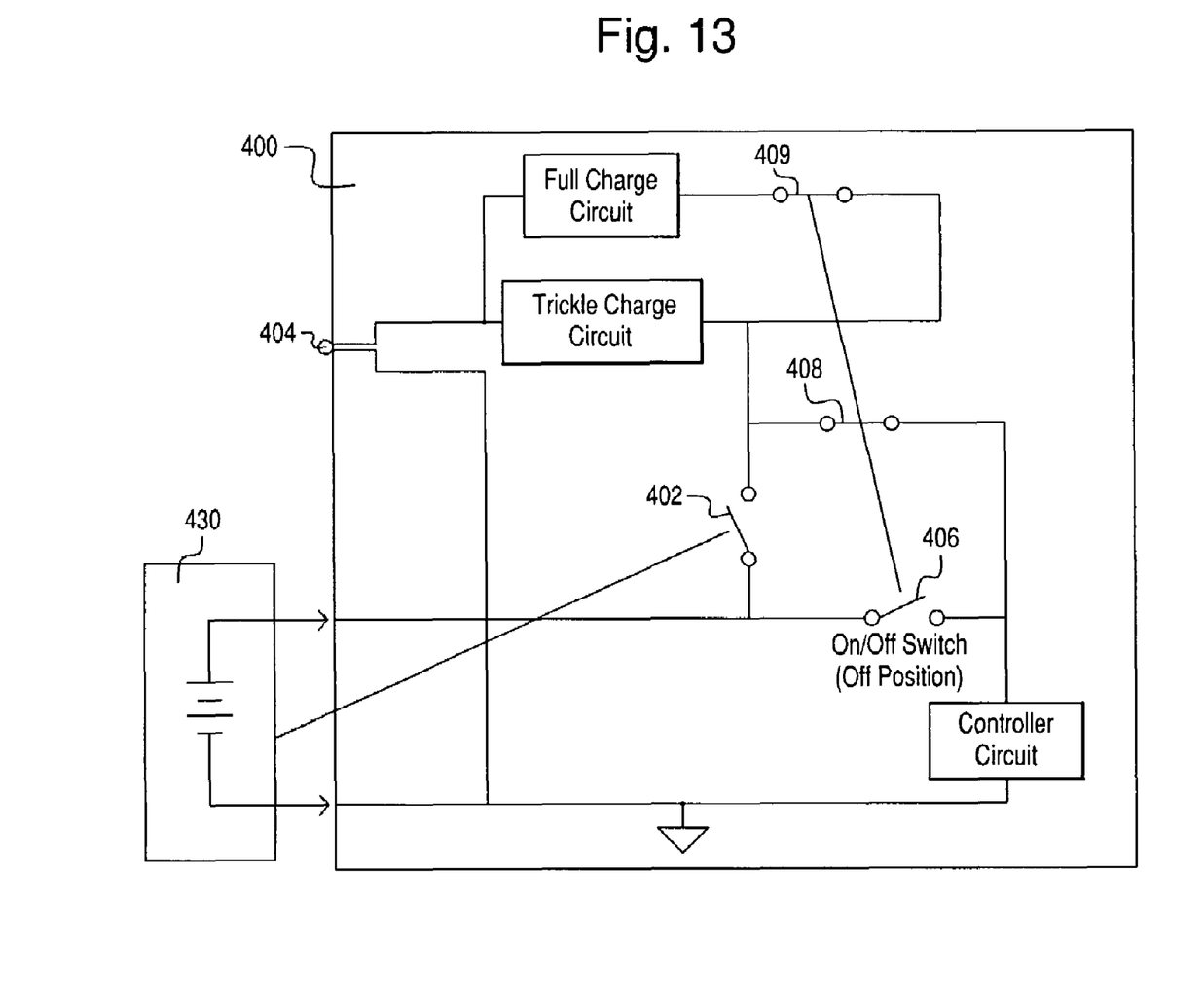

FIG. 13 shows a specific recharge circuit for a wireless controller 400 and rechargeable battery pack 430 for use with the XBox® game system. The circuit of FIG. 13 allows the battery pack 430 to be charged during game play or with the controller 300 in the 'off' position. Switch 402 is closed only when the rechargeable battery pack 430 is placed in the compartment of the controller and a mechanical actuator on the battery pack 430 closes the switch 402. Power (5 Volts) from an AC adaptor may be applied through port 404 for charging. With the controller 400 in the 'off' position (i.e., switch 406), the switch 408 and switch 409 provide power to the controller and provide full charge capability to the rechargeable battery pack 430. When the controller 400 is in the 'on' position (i.e., switch 406), a re-charge trickle charge is sent to the rechargeable batteries during use of the controller 400. Input power to the controller 400 is supplied through a two-connector cable connected to either the adapter/receiver or a game console.

Figure 14:
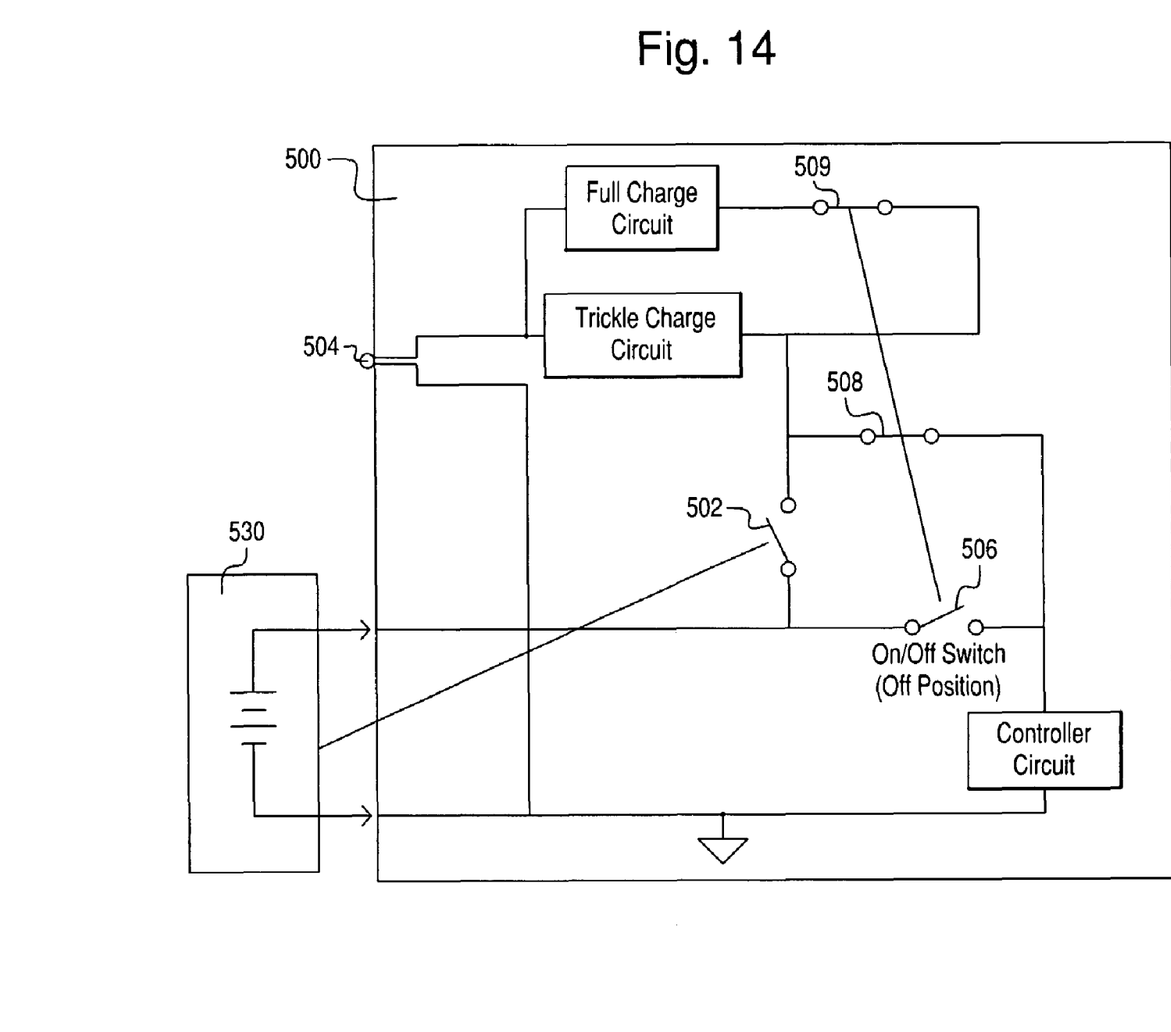
FIG. 14 illustrates a specific recharge circuit for a wireless controller and rechargeable battery pack for use with the PS2® game system.

FIG. 14 shows a specific recharge circuit for a wireless controller 500 and rechargeable battery pack 530 for use with the PS2® game system. The circuit of FIG. 14 allows the battery pack 530 to be charged during game play or with the controller 500 in the 'off' position. Switch 502 is closed only when the rechargeable battery pack 530 is placed in the compartment of the controller and a mechanical actuator on the battery pack 530 closes the switch 502. Power (8 Volts) from an AC adaptor may be applied through port 504 for charging. With the controller 500 in the 'off' position (i.e., switch 506), the switch 508 and switch 509 provide power to the controller and provide full charge capability to the rechargeable battery pack 530. When the controller 500 is in the 'on' position (i.e., switch 506), a re-charge trickle charge is sent to the rechargeable batteries during use of the controller 500. Input power to the controller 500 is supplied through a two-connector cable connected to either the adapter/receiver or a game console.

Figure 15:
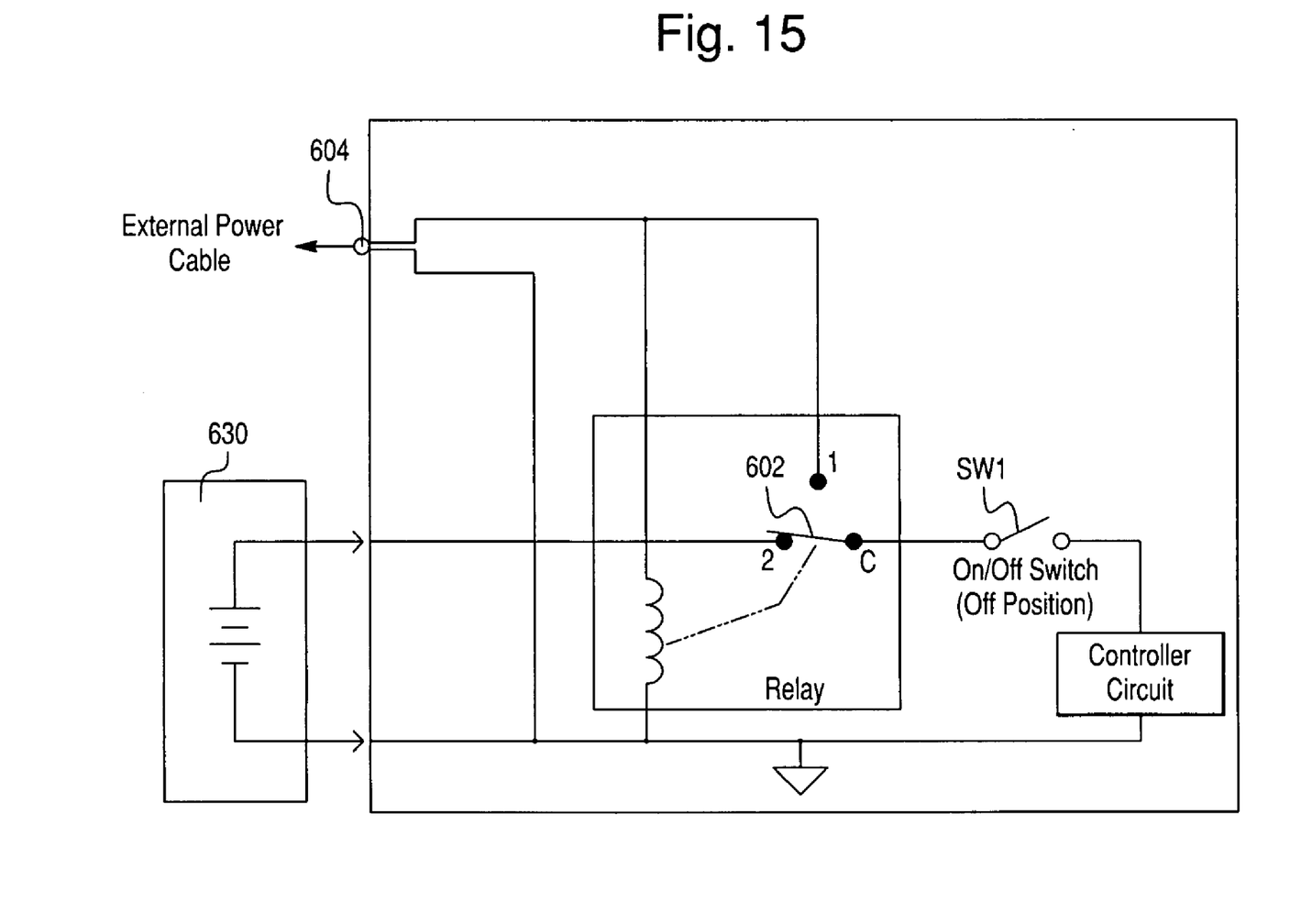
FIG. 15 illustrates a specific circuit for wireless/wired controller that can be powered by disposable batteries or by a direct power cable when the batteries are low.

FIG. 15 shows a specific circuit for wireless/wired controller 600 that can be powered by disposable batteries 630 or by a direct power cable when the batteries 630 are low. Switch 602 is used to connect/disconnect the batteries from the circuit. When no external power is applied to the controller 600 at input port 604, the controller 600 is configured to function from the batteries 630. When external power is connected to the controller at input port 604, the batteries are disconnected and the controller 600 is powered from the external power source. The relay s shown with no power applied from the external power source.

Figure 5:
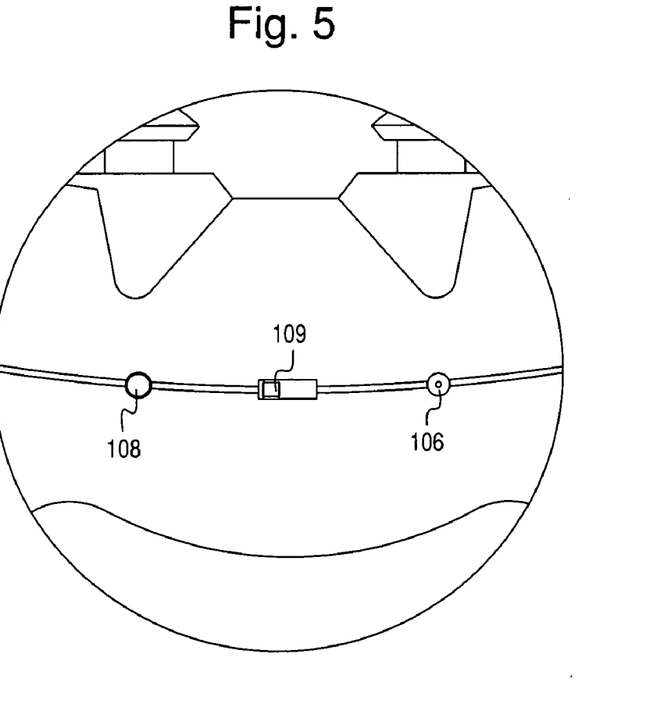
FIG. 5 is a side view of the controller of FIG. 2.

FIG. 5 is a side view of the controller 100 shown in FIG. 2.

Figures 6, 7:
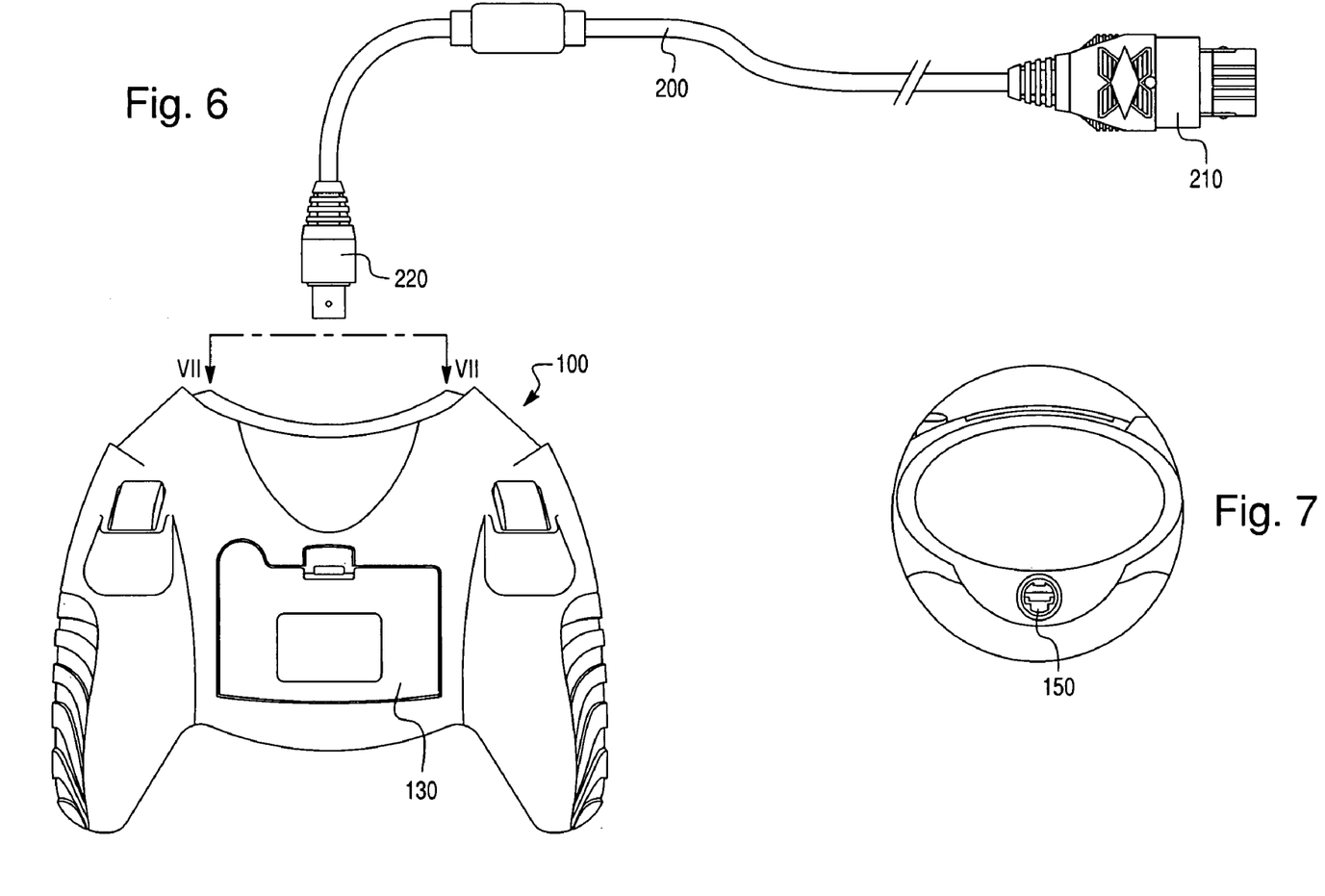
FIG. 6 is a bottom view of the controller of FIG. 2 shown in conjunction with a controller cable used to both sending two-way communication signals between the game console and the controller as well as sending a charging signal to recharge to batteries of the controller.
FIG. 7 is an enlarged view of the front of the controller as viewed along view line VII—VII shown in FIG. 6.

FIG. 6 shows one embodiment of the recharging capability of the present invention; namely, a communication cable 200 facilitates communication with a stand-alone computer gaming console 54 is also provided to recharge the battery pack. The communication cable 200 is adapted to interface with the controller ports of the game console 54 at the first end plug 210 and to interface with the controller 100 at the second end controller cable plug 220 at the controller cable port 150. See controller cable port 150 shown in FIG. 7. When the rechargeable batteries 130 shown in FIG. 6 need to be recharged, the cable 200 can be plugged into both the console 54 and the controller 100 to recharge the batteries or battery pack 130. The cable 200 also delivers control signal between the controller 100 and the game console 54. In this case, it is possible to facilitate communication between the game console 54 and the controller 100 while recharging the batteries. In this embodiment, the wireless controller functions as a conventional wired controller to facilitate play while charging. See FIGS. 11 and 12.

Figures 8, 9:
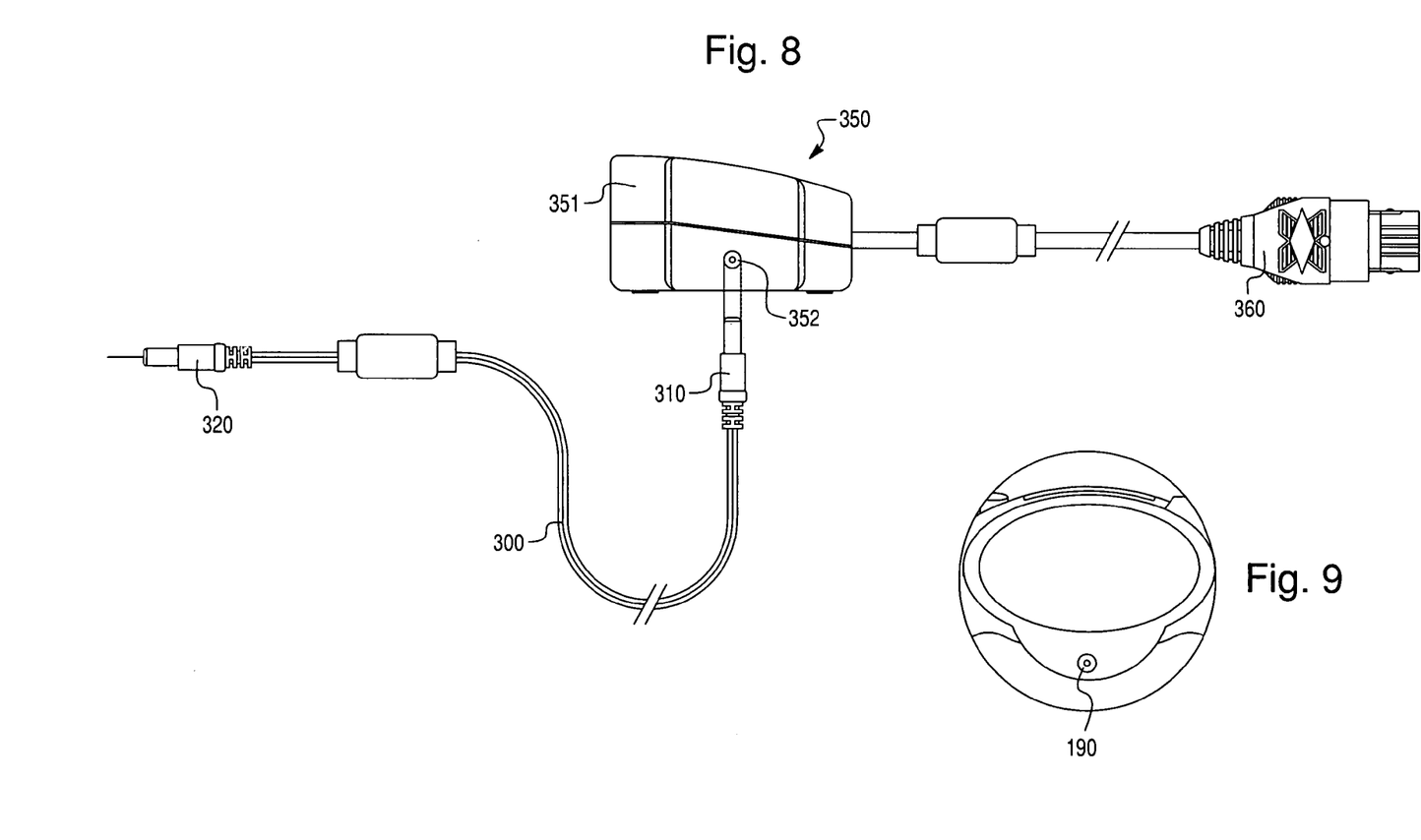
FIG. 8 is an illustration of a wireless adapter and a controller power cable used to send a charging signal to recharge to batteries of the controller.
FIG. 9 is an enlarged view of the front of the controller similar to the view shown in FIG. 7.

FIG. 8 shows an alternate system for charging the batteries of the controller where a power plug 300 delivers a charging signal from the wireless adapter 350 to the controller 100. As known in the art, the conventional game console 54 may be converted for wireless communication by the adapter 350 which interfaces with the game console 54 at the console plug 360 which fits into the controller port of the game console 54. The wireless controller 100 sends and received wireless signals to and from the receiver unit 351, which signals are then transmitted to the game console through the controller port of the game console 54. The receiver unit 351 is provided with a power jack 352 that receives the power plug 310, and the other end 320 of the power plug is connected to the controller 1000 at a charging port 190 shown in FIG. 9. In this embodiment, the wireless controller functions as a wireless controller that communicates with the wireless transmitter/receiver unit 351 during the charging operation. See FIGS. 13 and 14.

This invention also envisions a combination of the features of FIGS. 6–9, where the wireless controller 100 may include both the controller cable port 150 (see FIG. 7) as well as the power charging port 190 (see FIG. 9) to provide a versatile charging arrangement that permits both wired or wireless communication during the charging operation.

Thus, the controller 100 has the ability to communicate with the gaming console through dual channels. First, the controller has wireless transmission/receiver circuitry to wirelessly communicate to the gaming platform via the receiver/transmitter unit 350 and establish wireless two-way communication there between. Circuitry for the wired connection is also provided to allow direct connection via controller cable 200 shown in FIGS. 6 and 7. The wired circuitry may include a simple detection circuit, detecting the voltage supplied by the console via cable 200 to select transmission through the wired circuitry. This detection isolates the wireless transmission circuitry during said connection. Furthermore, the detection circuitry shunts/diverts voltage to the recharging circuitry to facilitate charging of the batteries. See FIGS. 10–15. Thus the ability to use multiple sources of voltage (through direct coupling to gaming platform, connection to wireless receiver 350, or to a dedicated voltage source such as a conventional converter) coupled with the capability to communicate to the game platform through dual mediums (wired or wireless) affords tremendous flexibility and convenient to the user. For example, when the batteries are low, the player may still use the wireless controller via cable 200 and simultaneous play and recharge the battery. Thus, a player need not invest in additional wired controller as a back up for times when the batteries run out. Furthermore, the receiver unit 350 may be formed as a cradle unit corresponding to a shape of the controller to both provide a storage bay for the wireless controller and provide a physical direct connection to charge the battery pack avoiding the necessity for cable 300. Such an arrangement provides an incentive to maintain the controller in this dedicated location and ensures that the batteries within the controller are always sufficiently charged to facilitate play and thus avoid recharging down time.

The controller 100 also has dual sources for recharging the batter pack. As previously mentioned, voltage may be drawn from voltage supplied through the wired cable 200 coupled directly to the gaming platform. However, controller 100 may also be provided with supplemental charge port to be connected to an alternate voltage source such as a dedicated power cable 300 through a connection to the adapter receiver unit 350 or from another power source.

Although the power plug 300 is shown as a separate cord, it will be understood by those of skill in the art that the power plug 300 may be integrated into the wireless adapter unit 350. Similarly, the adapter unit 350 may be formed as a cradle for the controller such that the controller may be electrically connected to the adapter unit by sitting directly on the adapter when the controller is not being used. In this case, the battery charge port 106 (see FIG. 4) mates directly with a jack on the adapter 351. When cradled in this manner, the controller batteries may be recharged without connecting or disconnecting separate cables. The controller simply cradles with the adapter unit for the purpose of recharging the controller batteries 130.

It is also noted that the present invention provides a special safety device (e.g., charging circuit activation switch 102) that prevents accidental charging of disposable batteries through the controller charging port. The charging circuitry is "closed" when the specially designed battery pack is mounted to the controller by a mechanical actuator that physically closes a switch in the recharging circuit. See FIGS. 10–15.

It will also be apparent to those of skill in the art that the detachable controller cable shown in FIGS. 6 and 8 provides alternative means of power with simultaneous two-way communication even when batteries are not available.

The invention also envisions an idle sleep mode for the battery-powered controller to conserve power when the controller is not is use. Likewise, the smart circuit design of this invention detects when power from detachable controller cable is available in order to isolate and preserve battery power.

Moreover, the invention allows the use of either disposable batteries or a rechargeable battery pack.

While the foregoing invention has been shown and described with reference to specific embodiments, it will be understood by those of skill in the art that various changes in form and detail may be made therein without departing from the spirit and scope of the present invention.

What is claimed is:

1. A battery recharging system for a wireless computer game controller, comprising:
   at least one rechargeable battery adapted to be electrically connected to said wireless computer game controller;
   a wireless adapter that converts the game console into a wireless transmitter/receiver by sending and receiving wireless control signals with said wireless computer game controller and delivering said control signals to a control port of a game console;
   at least one battery charge port for electrically connecting a power source to recharge said at least one rechargeable battery;
   at least one power cable for delivering power from one of said wireless adapter and said game console to said rechargeable battery while the at least one rechargeable battery is installed on the controller,
   wherein said rechargeable battery may be recharged through the controller while the controller sends and receives wireless control signals with said game console.

2. The system of claim 1, wherein said power cable is configured to deliver power directly from said wireless adapter to said at least one battery charge port.

3. The system of claim 1, wherein said power cable is configured to connect to said game console through a game port.

4. The system of claim 1, wherein said controller communicates with said game console solely by wireless communication through said adapter.

5. The system of claim 1, further comprising a detection circuit for detecting a voltage supplied via said at least one power cable to initiate charging of said rechargeable battery.

* * * * *